United States Patent

Sekiguchi

[11] Patent Number: 5,191,482
[45] Date of Patent: Mar. 2, 1993

[54] LENS DRIVING APPARATUS

[75] Inventor: Tetsuo Sekiguchi, Tokyo, Japan

[73] Assignee: Asahi Kogaku Kagyo Kabushiki Kaisha, Tokyo, Japan

[21] Appl. No.: 642,788

[22] Filed: Jan. 18, 1991

[30] Foreign Application Priority Data

Jan. 19, 1990 [JP] Japan .................. 2-3622

[51] Int. Cl.⁵ .............................................. G02B 7/02
[52] U.S. Cl. ..................... 359/819; 359/695; 359/700; 359/701; 359/823
[58] Field of Search ............... 359/819, 827, 694, 695, 359/699, 700, 701, 705, 823, 825, 830; 354/195.1

[56] References Cited

U.S. PATENT DOCUMENTS

| | | | |
|---|---|---|---|
| 3,850,507 | 11/1974 | Uesugi | 359/695 |
| 3,915,557 | 10/1975 | Shimojima | 359/695 |
| 4,324,457 | 4/1982 | Tomori | 350/430 |
| 4,333,712 | 6/1982 | Tomori | 350/430 |
| 4,346,967 | 8/1982 | Komoto et al. | 350/430 |
| 4,387,968 | 6/1983 | Sekiguchi | 350/429 |
| 4,445,756 | 5/1984 | Komoto | 350/429 |
| 4,487,482 | 12/1984 | Itoh et al. | 350/429 |
| 4,506,959 | 3/1985 | Hama | 350/430 |
| 4,523,815 | 6/1985 | Tomori | 350/430 |
| 4,588,266 | 5/1986 | Komoto | 350/439 |
| 4,627,691 | 12/1986 | Tomori | 350/429 |
| 4,729,644 | 3/1988 | Ueyama | 350/429 |
| 4,890,132 | 12/1989 | Hama | 354/400 |
| 4,950,060 | 8/1990 | Nagasaka | 350/429 |
| 5,018,843 | 5/1991 | Inadome et al. | 350/429 |

FOREIGN PATENT DOCUMENTS 50-14511 5/1975 Japan .

Primary Examiner—Frank Gonzalez
Attorney, Agent, or Firm—Sandler Greenblum & Bernstein

[57] ABSTRACT

A lens driving apparatus for moving a plurality of lens groups, in an optical axis direction, to change the spatial distance therebetween, including a supporting cylinder which is secured to an immovable portion of a lens barrel, a cam ring which is rotatably fitted on the supporting cylinder, at least two inner lens moving frames which are provided in the supporting cylinder so as to move in the optical axis direction, guide grooves which are formed on the supporting cylinder to guide the lens moving frames in the optical axis direction, cam grooves which are formed on the cam ring to move the lens moving frames along therewith, and cam followers which are secured to the inner lens moving frames and which extend through the corresponding guide grooves to be fitted into the corresponding cam grooves.

21 Claims, 4 Drawing Sheets

LENS DRIVING APPARATUS

BACKGROUND OF THE INVENTION

1. Field of the Invention

The present invention relates to a lens driving apparatus for moving a lens, and more particularly, it relates to a driving apparatus for moving two or more groups of photographing lenses for zooming and/or focusing.

2. Description of Related Art

In a known camera having a zoom lens, which usually consists of two or more lens groups, the lens groups are moved in the optical axis direction to change the relative spatial distance therebetween which effects the zooming.

Generally, a cam mechanism is used to move the lens groups. There are two types of cam mechanisms, one of which includes a supporting cylinder (immovable cylinder), which has a guide groove to move the lens groups (cam followers) in the optical axis without rotating about the optical axis. The other type of cam mechanism includes a cam ring, which has a cam groove to move the lens groups in the optical axis direction, while maintaining a predetermined relationship therebetween.

However, in the case of a cam mechanism of a zoom lens having more than two lens groups, the cam grooves must be provided not only in the cam ring (driver), but also in another member, as shown in FIG. 8.

In a known zoom lens as shown in FIG. 8, a supporting cylinder 61 is secured to a mount 63 which is fitted in a mount of a camera body. The supporting cylinder 61 is surrounded by an outer cylinder 65 which is secured at its rear end to the mount 63. A driving cam ring 67 is rotatably fitted in the supporting cylinder 61. A driven cam ring 69 (follower) is rotatably fitted between the supporting cylinder 61 and the outer cylinder 65.

The driven cam ring 69 is surrounded by a first lens moving frame 71 which is movable together therewith. Second and third lens moving frames 73 and 75 are fitted in the driving cam ring 67, so as to move in the optical axis direction.

The driven cam ring 69 is provided with a first cam groove 77 for the first lens moving frame 71. The driving cam ring 67 has second and third cam grooves 79 and 81 for the second and third lens moving frames 73 and 75, respectively.

The supporting cylinder 61 is provided with at least three guide grooves 82, 83 and 84 which guide the first, second and third lens moving frames 71, 73 and 75, respectively.

The driving cam ring 67 is provided on its outer surface with a first cam follower 89, which extends through the first guide groove 82 and is fitted in the first cam groove 77 of the driven cam groove 69. The second and third lens moving frames 73 and 75 have second and third cam followers 91 and 93, which extend through the second and third cam grooves 79 and are 81 and fitted in the second and third guide grooves 83 and 84, respectively.

The driving cam ring 67 is driven and rotated by a zoom operation ring 85, which is rotatably fitted on the outer cylinder 65 through a pin 87, which extends through a circumferential groove 62, circumferentially formed in the supporting cylinder 61.

In the known lens driving apparatus, as constructed above, the cam grooves are provided on the two separate members (driving cam ring 67 and the driven cam ring 69), thus resulting in a complex and expensive assembly.

To reduce the manufacturing cost, it is theoretically possible to make the supporting cylinder 61 and the cam rings 67 and 69, etc., of synthetic resin which is relatively inexpensive. However, since the circumferential groove 62 is provided on the supporting cylinder 61 to permit the pin 87, that connects the zoom operation ring 85 and the driving cam ring 67, to move in the known arrangement, as shown in FIG. 8. The supporting cylinder 61 must be made of strong material, and accordingly, it is practically difficult to make the supporting cylinder 61 of plastic (synthetic resin).

Furthermore, if the cam grooves are concentratively provided only on the driving cam ring, to simplify and reduce the number of elements of the known apparatus, as mentioned above, the supporting cylinder must be provided with three guide grooves for the three cam grooves, thus resulting in a reduced strength thereof. This also makes it difficult to make the supporting cylinder of plastic. In addition, since the number of split molding dies is increased, no reduction of manufacturing cost can be realized.

SUMMARY OF THE INVENTION

The primary object of the present invention is to provide a simple lens driving apparatus in which the components are strong enough to make it possible to manufacture the components of synthetic resin.

To achieve the object mentioned above, according to the present invention, a cam ring is fitted on a supporting cylinder, and at least one pair of lens moving frames is provided in the supporting cylinder to move in the optical axis direction. Cam followers are secured to the lens moving frames, and extend through corresponding cam grooves formed in the cam ring and corresponding guide grooves formed in the supporting cylinder.

With this arrangement, since it is not necessary to provide a circumferential groove to permit a connecting member, that connects the zoom operation ring, which is rotatably provided on the outer cylinder of the lens and the cam ring, to move on the supporting cylinder, when the cam ring is rotated by the zoom operation ring, the strength of the supporting cylinder can be increased.

According to an aspect of the present invention, there is provided a lens driving apparatus, for moving a plurality of lens groups in an optical axis direction to change the spatial distance therebetween, comprising a supporting cylinder which is secured to an immovable portion of a lens barrel, a cam ring which is rotatably fitted outside the supporting cylinder, at least two internal lens moving frames which are provided in the supporting cylinder so as to move in the optical axis direction, guide grooves which are formed on the supporting cylinder to guide the lens moving frames in the optical axis direction, cam grooves which are formed on the cam ring to move the lens moving frames along therewith, and cam followers which are secured to the internal lens moving frames, and extends through the corresponding guide grooves into the corresponding cam grooves.

Preferably, the lens driving apparatus further comprises a rotatable zoom operation ring provided outside the cam ring.

Preferably, the provision is made to a driven ring, which is fitted on the cam ring, so as to move in the optical axis direction.

The driven ring has a cam follower which extends in a direction perpendicular to the optical axis passing through the cam grooves of the cam ring to be fitted into the guide grooves of the guide ring.

Consequently, all of the cam grooves are formed in one cam ring, and accordingly, the manufacturing and assembling processes can be simplified.

The present disclosure relates to subject matter contained in Japanese utility model application No. 02-3622 (filed on Jan. 19, 1990), which is expressly incorporated herein by in its entirety.

BRIEF DESCRIPTION OF THE DRAWINGS

The invention will be described below, in detail with reference to the accompanying drawings, in which.

DESCRIPTION OF PREFERRED EMBODIMENTS

Figure 1:
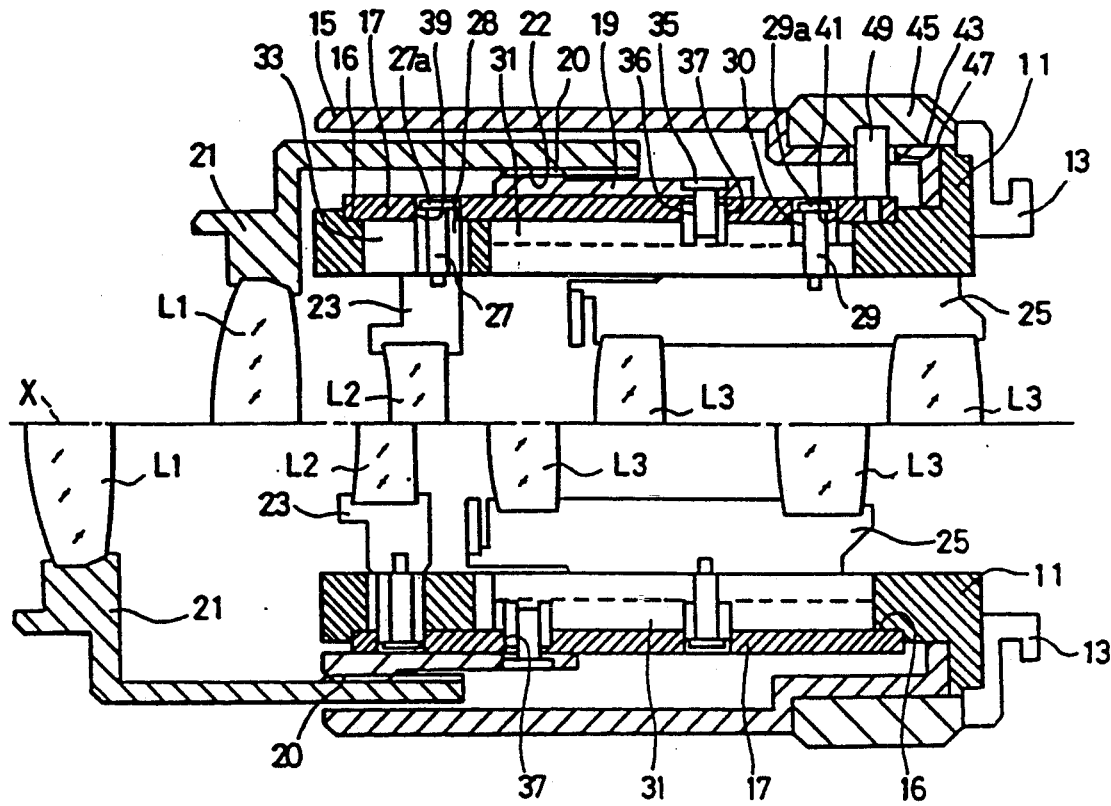
FIG. 1 is a longitudinal sectional view of a zoom lens having three lens groups, to which a lens driving apparatus of the present invention is applied, taken along an optical axis.

FIG. 1 shows a zoom lens having three lens groups to which the present invention applies. In FIG. 1, the upper half shows a wide angle position and the lower half a telephoto position.

The zoom lens is used as a interchangeable lens of a single lens reflex camera. A supporting cylinder 11 is provided on its rear end with a mount 13 which can be fitted in a mount of a camera body. The supporting cylinder 11 is surrounded by an outer cylinder 15, which is secured at its rear end to the supporting cylinder 11, and accordingly, the mount 13.

The supporting cylinder 11 is provided, on its outer periphery, with a peripheral recess 16 which extends over the whole periphery thereof, so that a cam ring 17 is fitted in the recess 16, so as to rotate about the optical axis X.

The cam ring 17 is fitted in a rotatable driven ring 19, which is provided on its outer periphery with a helicoid 20.

Between the cam ring 17 and the supporting cylinder 11 is fitted a cylindrical first lens moving frame 21 which holds a first lens group L1. The first lens moving frame 21 is provided, on the inner peripheral surface of the rear end, with a helicoid 22, which is in mesh with the helicoid 20 of the driven ring 19.

A pair of second and third lens moving frames 23 and 25 are fitted in the supporting cylinder 11, to move in the optical axis direction. The second and third lens moving frames 23 and 25 are provided on their outer peripheral surfaces with second and third roller shafts 27 and 29, having enlarged heads 27a and 29a, respectively. The roller shafts 27 and 29 have second and third rollers 28 and 30, which are rotatable supported on the roller shafts 27 and 29, respectively. The roller shafts 27 and 29 and the rollers 28 and 30 constitute cam followers. The second and third lens moving frames 23 and 25 hold second and third lens groups L2 and L3, respectively.

The supporting cylinder 11 has a pair of first and second guide grooves 31 and 33, which extend in a direction parallel with the optical axis.

The driven ring 19 has a first roller shaft 35, which extends in a direction perpendicular to the optical axis and which rotatably supports a first roller 36.

The first roller 36 extends through the first cam groove 37, formed in the cam ring 17, and is fitted in the first guide groove 31 of the supporting cylinder 11. The second roller 28 extends through the second guide groove 33 and is fitted in the second cam groove 39 formed in the cam ring 17. The third roller 30 extends through the first guide groove 31 and is fitted in the third cam groove 41 formed in the cam ring 17.

Figure 2:
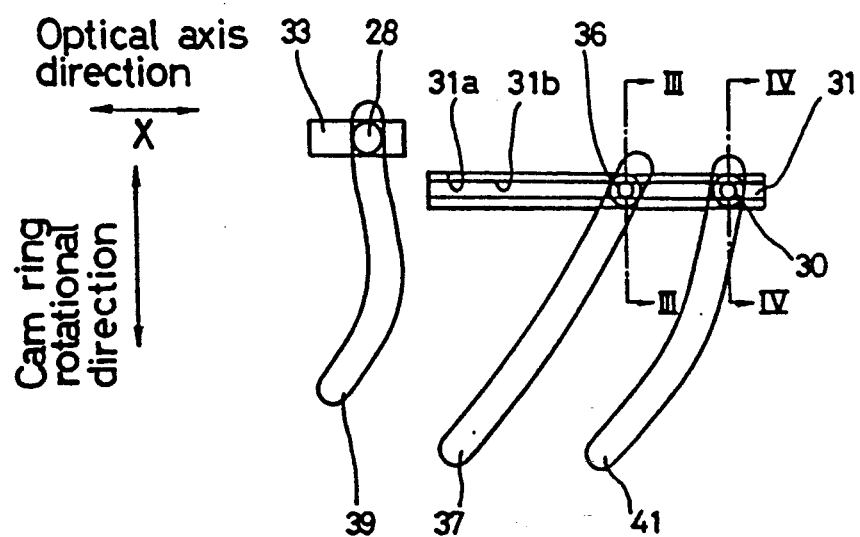
FIG. 2 is an explanatory plan view showing a relationship of guide grooves and cam grooves of a zoom lens shown in FIG. 1.

Note that all of the roller shafts 27, 29 and 35 appear in the same section in FIG. 1, only for clarification. However, in practice, the roller shaft 27 (roller 28) is circumferentially offset from the roller shafts 29 and 35 in a preferred embodiment, as shown in FIG. 2. It should be appreciated that the number of the roller shafts 27, 29 and 35, which is preferably 2-3, is not limited to three and can be optionally selected.

The outer cylinder 15 has, at its rear end, a smaller diameter portion 43 which defines an annular recess with the mount 13, so that the zoom operation ring 45 is rotatably fitted in the annular recess. The smaller diameter portion 43 is provided with a circumferential groove 47 through which a pin 49 extends to connect the zoom operation ring 45 and the cam ring 17, so as to rotate together.

In FIG. 2, the supporting ring 11 and the cam ring 17 are developed to show a relationship of the second guide groove 33, the first guide groove 31, the second cam groove 39, the first cam groove 37, the third cam groove 41, the second roller 28, the first roller 36, and the third roller 30 in plan view. As can be seen in FIG. 2, the second guide groove 33 and the first guide groove 31 are circumferentially offset from one another. The first roller 36 and the third roller 30 are fitted in the first guide groove 31.

The guide grooves 31 and 33 are immovable, since the supporting cylinder 11 constitutes a stationary body, but the cam grooves 37, 39 and 41 are moved in a direction (vertical direction in FIG. 2) perpendicular to the optical axis X when the cam ring 17 rotates.

The zoom lens, as constructed above, operates as follows.

When the zoom operation ring 45 is manually rotated by a photographer, the cam ring 17, which is connected to the zoom operation ring through the pin 49, is rotated together, so that the cam grooves 37, with the zoom operation ring, 39 and 41 are moved in a direction (vertical direction in FIG. 2) perpendicular to the optical axis X. However, no movement of the guide grooves 31 and 33 takes place, since the supporting cylinder 11 does not rotate. Consequently, the intersecting points of the cam grooves 39, 37 and 41 and the guide grooves 31 and 33 are moved in the optical axis direction, so that the rollers 28, 36 and 30, which are located at the intersecting points, are moved in accordance with the movement of the intersecting points. Namely, the driven ring 19 and the first lens moving frame 21, and the second lens moving frame 23 and the third lens moving frame 25 are moved in the optical axis direction by and along the guide grooves 31 and 35, in accordance with the cam profiles of the cam grooves 37, 39 and 41, respectively. As a result, the lens groups L1, L2 and L3 are moved in the optical axis direction to change the spatial distance therebetween which effects the zooming.

Figure 3:
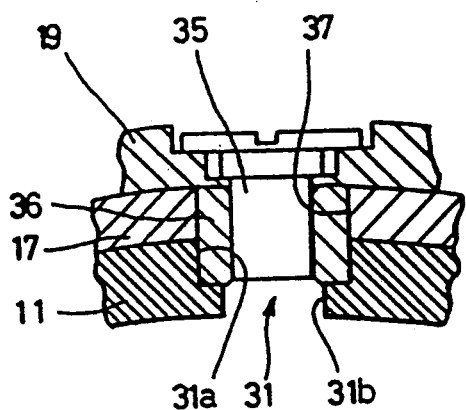
FIG. 3 is a partial sectional view taken along the line III—III in FIG. 2.
Figure 4:
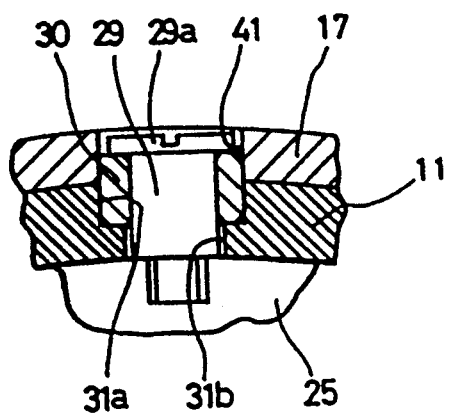
FIG. 4 is a partial sectional view taken along the line IV—IV in FIG. 2.

The following discussion will be directed to the third guide groove 33 which constitutes one of the most significant features of the present invention, with reference to FIGS. 3 and 4 which are sectional views taken along the lines III—III and IV—IV in FIG. 2, respectively.

The first guide groove 31 has a stepped sectional shape, including an outer groove portion (wider groove portion) 31a and an inner groove portion (narrow groove portion) 31b. The width of the wider portion 31a is identical to that of the first cam groove 37 and the third cam groove 41. The width of the narrow groove portion 31b is such that the rollers 30 and 36 can not pass therethrough, but the third roller shaft 29 can pass therethrough with a slight clearance between the narrow groove portion 31b and the third roller shaft 29.

The first roller 36, which is fitted on the first roller shaft 35 provided on the driven ring 19, extends through the first cam groove 37 and is fitted in the wider groove portion 31a. The third roller 30, which is fitted on the third roller shaft 29 provided on the third lens moving frame 25, is fitted in the third cam groove 41 and the wider groove portion 31a.

Since the first cam groove 33 is comprised of the outer, wider groove portion 31a and the inner, narrow groove portion 31b, which is narrower than the diameter of the first roller 36 which is fitted in the wider groove portion 31a, as mentioned above, the first roller 36 can not be disengaged from the first roller shaft 35.

Figure 5:
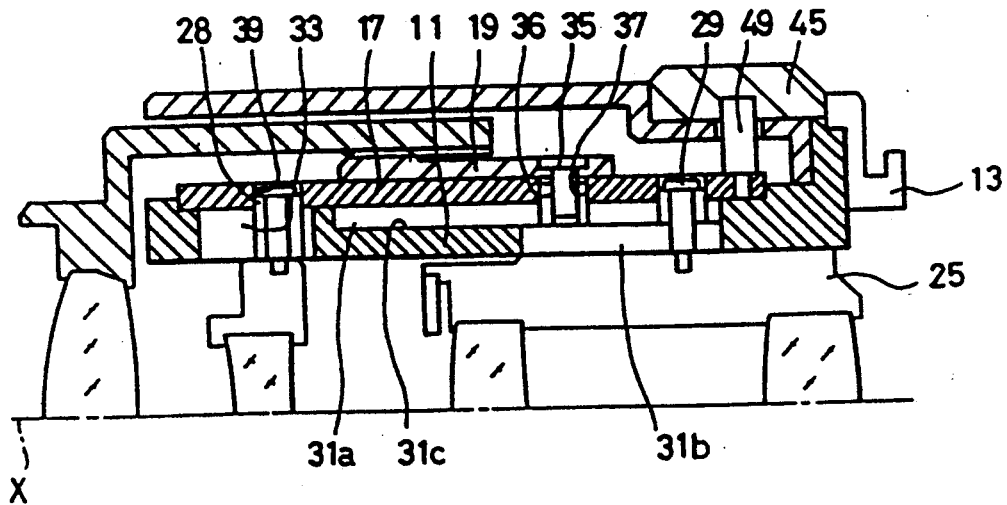
FIG. 5 is a sectional view of an upper half of a zoom lens, having three lens groups according to another aspect of the present invention.
Figure 6:
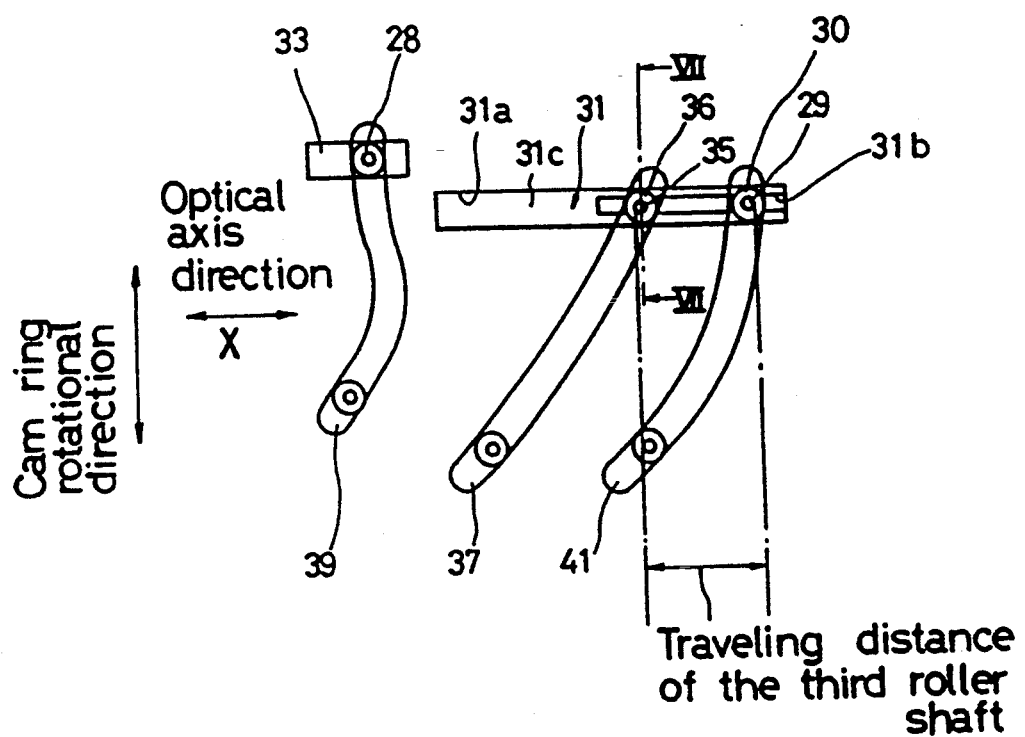
FIG. 6 is an explanatory plan view showing a relationship of guide grooves and cam grooves of a zoom lens shown in FIG. 5.
Figure 7:
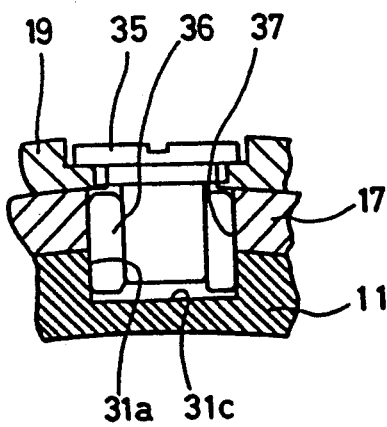
FIG. 7 is a partial sectional view taken along the line VII—VII in FIG. 6.
Figure 8:
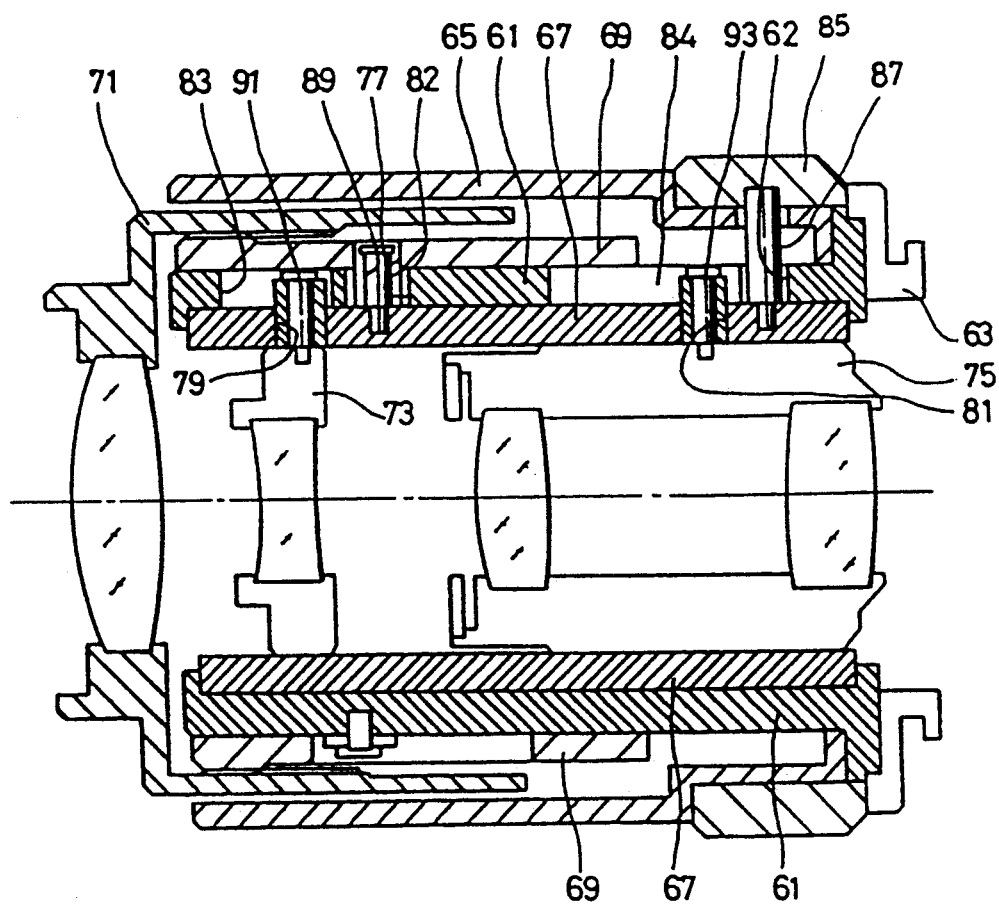
FIG. 8 is a longitudinal sectional view of a known zoom lens having three lens groups.

FIGS. 5 through 7 show another embodiment of the present invention. FIGS. 5, 6 and 7 correspond to FIGS. 1, 2 and 3, respectively. The basic construction of the modified embodiment shown in FIGS. 5 through 7 is the same as that of FIGS. 1 through 3. Accordingly, the elements of the modified (second) embodiment corresponding to those in FIGS. 1 through 3 are designated with the same reference numerals.

In the second embodiment, the narrow groove portion 31b of the first guide groove 3 partially extends within a range corresponding to the displacement of the third roller 30. Namely, no narrow groove portion 31b exists beyond the range of the displacement of the third roller 30. In the section out of the range of displacement of the third roller 30, the wider groove portion 31a has a bottom 31c, which contributes to an increase of the strength of the supporting cylinder 11.

As can be understood from the foregoing, according to the second embodiment of the present invention, since the cam ring 17 is provided outside the supporting cylinder 11, neither a circumferentially extending groove through which the pin 49 connecting the zoom operation ring 45 and the cam ring 17 extends, nor a circumferentially extending groove through which the roller shaft for driving the first lens group extends are needed on the supporting cylinder 11, thus resulting in an increase in the strength of the supporting cylinder 11. This makes it possible to mold the supporting cylinder 11 of plastic.

Since the cam grooves of the lens groups are formed on one cam ring 17, the manufacturing and assembling processes of the apparatus are inexpensively simplified.

Since the driven ring 19, for moving the first lens group Projecting outward from the outer cylinder 15, and the first lens moving frame 21 have no cam groove, both the driven ring 19 and the first lens moving frame 21 require less strength and decreased precision. Accordingly, the driven ring 19 and the first lens moving frame can be easily molded of plastic.

Although the above discussion has been directed to a zoom lens having three lens groups, the present invention can be generically applied to a zoom lens having a plurality of lens groups which are movable in the optical axis direction.

Although the two guide grooves 31 and 33 are provided so that the roller 36 of the first lens moving frame 21, at the front end thereof, and the third lens moving frame 25, at the rear end are fitted in one of the guide grooves 31 and 33, the present invention is not limited to that arrangement. For instance, the guide grooves can be formed on the separate members or can be replaced with a single guide groove.

As can be seen from the above discussion, according to the present invention, the number of the grooves formed in the supporting cylinder can be reduced, thus resulting in an increase of the strength thereof. This makes it possible to make or mold the supporting cylinder of synthetic resin. Furthermore, since the cam grooves can be formed in the same cam ring, the machining process of the cam grooves can be simplified. In addition, since the cam ring is located outside the supporting cylinder, it is not necessary to provide a groove through which the connecting member, which connects the zoom operation ring and the cam ring, extends on the supporting cylinder. This also increases the strength of the supporting cylinder.

I claim:

1. A lens dividing apparatus for moving a plurality of lens groups in an optical axis direction to change the spatial distance therebetween, comprising:
    a supporting cylinder which is secured to an immovable portion of a lens barrel;
    a cam ring which is rotatably fitted on said supporting cylinder;
    at least two inner lens moving frames which are provided in said supporting cylinder, so as to move in the optical axis direction;
    guide grooves which are formed on said supporting cylinder;
    cam grooves which are formed on said cam ring to move said moving frames along therewith when said cam ring is rotated; and
    cam followers which are secured to said inner lens moving frames and which extend through corresponding said guide grooves to be fitted into corresponding said cam grooves to guide said lens moving frames in the optical axis direction, wherein the number of said guide grooves is smaller than the number of said inner lens moving frames.

2. A lens driving apparatus according to claim 1, further comprising a rotatable zoom operation ring provided outside said cam ring.

3. A lens driving apparatus according to claim 2, further comprising a connecting member which connects the zoom operation ring and the cam ring, so as to rotate together.

4. A lens driving apparatus according to claim 1, further comprising a driven ring which is fitted on the cam ring, and means on said cam ring and said driving ring for moving said driving ring in the optical axis direction.

5. A lens driving apparatus for moving a plurality of lens groups in an optical axis direction to change the spatial distance therebetween, comprising:
   a supporting cylinder which is secured to an immovable portion of a lens barrel;
   a cam ring which is rotatably fitted on said supporting cylinder;
   at least two inner lens moving frames which are provided in said supporting cylinder, so as to move in the optical axis direction;
   guide grooves which are formed on said supporting cylinder;
   cam grooves which are formed on said cam ring to move said moving frames along therewith when said cam ring is rotated;
   cam followers which are secured to said inner lens moving frames and which extend through corresponding said guide grooves to be fitted into corresponding said cam grooves to guide said lens moving frames in the optical axis direction; and
   a driven ring which is fitted on said cam ring, and means on said cam ring and said driven ring for moving said driving ring in the optical axis direction.

6. A lens driving apparatus according to claim 5, wherein said driven ring has said cam follower, which extends in a direction perpendicular to the optical axis, to pass through said cam grooves of the said cam ring, to be fitted into said guide grooves of said guide ring.

7. A lens driving apparatus according to claim 6, further comprising an annular outer lens moving frame which is fitted on said driven ring and which is connected to said driven ring, so as to move together with said driven ring in the optical axis direction.

8. A lens driving apparatus according to claim 7, wherein the number of said inner lens moving frames is two.

9. A lens driving apparatus according to claim 8, further comprising a zoom operation ring which is rotatably fitted on said outer lens moving frame.

10. A lens driving apparatus according to claim 8, wherein the number of said guide grooves is two, so that said cam follower of said driven ring and said cam follower of one of said inner lens moving frames are fitted in one of two of said guide grooves, and said cam follower of the other of said inner lens moving frame is fitted in the other of said guide groove.

11. A lens driving apparatus according to claim 10, wherein said guide grooves are circumferentially spaced from one another.

12. A lens driving apparatus according to claim 10, wherein said one guide groove has an outer wider groove portion and an inner narrow groove portion in cross-section.

13. A lens driving apparatus according to claim 12, wherein said inner narrow groove portion lies within a range corresponding to the displacement of said cam follower of said one inner lens moving frame.

14. A lens driving apparatus for moving a plurality of lens groups in an optical axis direction to change the spatial distance therebetween, comprising:
   a supporting cylinder which is secured to an immovable portion of a lens barrel;
   a cam ring which is rotatably fitted on said supporting cylinder;
   at least two inner lens moving frame which are provided in said supporting cylinder, so as to move in the optical axis direction;
   guide grooves which are formed on said supporting cylinder;
   cam grooves which are formed on said cam ring to move said moving frames along therewith when said cam ring is rotated;
   cam followers which are secured to said inner lens moving frames and which extend through corresponding said guide grooves to be fitted into corresponding said cam grooves to guide aid lens moving frames in the optical axis direction; and
   a rotatable zoom operation ring provided outside said cam ring, and a connecting member which connects said zoom operation ring and said cam ring, so as to rotate together.

15. A lens driving apparatus for moving a plurality of lens groups in an optical axis direction, comprising:
   a supporting cylinder which is secured to an immovable portion of a lens barrel, said supporting cylinder being provided with at least one guide groove extending parallel to the optical axis;
   a cam ring which is rotatably fitted on said supporting cylinder, said cam ring being provided with at least one cam groove;
   a guide pin which is inserted through both of said guide groove and said cam groove from outside of said cam ring; and
   a lens frame which is functionally connected to said guide pin so as to move in the optical axis direction in accordance with the rotation of said cam ring.

16. A lens driving apparatus according to claim 15, wherein said guide groove includes a closed bottom.

17. A lens driving apparatus according to claim 15, wherein said guide pin is secured to a barrel member, which is fitted on the outside of said cam ring, said lens frame being engaged by screws to said barrel member.

18. A lens driving apparatus according to claim 15, further comprising an additional lens frame which is provided in said supporting cylinder so as to move in the optical axis direction.

19. A lens driving apparatus according to claim 18, wherein said additional lens frame includes a guide pin which is inserted in said guide groove of said supporting cylinder.

20. A lens driving apparatus according to claim 19, wherein said guide groove comprises an outer groove portion and an inner guide portion, said inner guide portion being narrower than said outer guide portion, and wherein said guide pin of said lens frame and said guide pin of said additional lens frame are inserted into said outer groove portion and said inner guide portion.

21. A lens driving apparatus according to claim 20, wherein said cam groove comprises an additional cam groove in which said guide pin is fitted, so that said additional lens frame moves in the optical axis direction in accordance with the rotation of said cam ring.

* * * * *

UNITED STATES PATENT AND TRADEMARK OFFICE
CERTIFICATE OF CORRECTION

PATENT NO. : 5,191,482
DATED : March 2, 1993
INVENTOR(S) : TETSUO SEKIGUCHI

It is certified that error appears in the above-indentified patent and that said Letters Patent is hereby corrected as shown below:

At column 7, line 5 (claim 4, line 3) of the printed patent, change "driving" to ---driven---.
At column 7, line 6 (claim 4, line 4) of the printed patent, change "driving" to ---driven---.
At column 7, line 30 (claim 5, line 23) of the printed patent, change "driving" to ---driven---.
At column 7, line 43 (claim 8, line 2) of the printed patent, change "the" to ---said---.
At column 8, line 19 (claim 14, line 19) of the printed patent, change "aid" to ---said---.

Signed and Sealed this

Twelfth Day of April, 1994

BRUCE LEHMAN

*Commissioner of Patents and Trademarks*

*Attest:*

*Attesting Officer*